May 19, 1970     B. S. JAVORSKY     3,512,577
METHOD AND APPARATUS FOR INTERGAS HEAT EXCHANGE
Filed Dec. 11, 1968

INVENTOR.
BRONISLAV STEFAN JAVORSKY
BY

Davis, Hoxie, Faithfull & Hapgood

United States Patent Office 3,512,577
Patented May 19, 1970

3,512,577
METHOD AND APPARATUS FOR INTERGAS HEAT EXCHANGE
Bronislav Stefan Javorsky, Huddinge, Sweden, assignor to Alfa-Laval AB, Tumba, Sweden, a corporation of Sweden
Filed Dec. 11, 1968, Ser. No. 782,828
Claims priority, application Sweden, Dec. 13, 1967, 17,103/67
Int. Cl. F28d *13/00*
U.S. Cl. 165—1                                  6 Claims

ABSTRACT OF THE DISCLOSURE

The heat transfer is effected in at least two steps in each of which the two gases are led through respective fluidized beds of solid particles while maintaining the beds in heat-transferring contact with a thermally conductive wall separating the two beds from each other. One of the gases is led through the first step and then through the second step while the other gas is led through the second step and then through the first step.

---

The present invention relates to a method and an apparatus for transferring heat from one gas to another.

The problem of effecting a heat exchange between two gases in an economical way is of current interest in many fields. One such field, wherein the present invention may become very important, is the field of ventilation, which at present has need for a heat exchanger whereby fresh air admitted to a house can be heated by air expelled from the house. A heat exchanger working in the conventional way is not suited for this purpose, as its heat exchanging gases. More particularly, air leaving a dwelling house contains considerable quantities of fat and dust particles which would adhere to the heat exchanging surfaces and reduce their heat transferring capacity. Moreover, a great deal of moisture which is condensed in the heat exchanger would in winter time freeze on part of the heat exchanging surfaces.

It is known to utilize fluidized beds for transferring heat from one gas to another. However, the efficiency of prior heat exchangers of this type is too low to make them suitable in the aforesaid field of ventilation.

The present invention provides a new method of utilizing fluidized beds for the transfer of heat from one gas to another. The principal feature of this method resides in carrying out the heat transfer in at least two steps, in each of which the respective gas is led through a fluidized bed of solid particles maintained in heat transferring contact with a thermally conductive wall separating the two beds from each other, one of the gases being led through the first step and then through the second step while the other gas is led first through said second step and then through said first step.

A heat exchanger operating in this manner provides a very effective heat transfer from one gas to the other, as the exchange of heat follows the so called countercurrent flow principle. A heat exchanger of this kind is also inexpensive to manufacture as well as to operate, which is a pre-requisite if it is to be economically justified for such applications as dwellings, where the heating costs must be relatively low. Moreover, it can withstand widely varying conditions of operation and can operate continuously for a very long time without being cleaned. Due to the fluidized beds, the heat exchanging surfaces are at all times kept free from insulating deposits of different kinds.

If the flow of the gas which is to give off or receive heat in the heat exchanger is not sufficient to fluidize the bed of particles of solid material, an auxiliary flow of a gas at a suitable temperature may be used for this purpose. Preferably, a part of the gas which has just passed the bed may be used for this purpose.

Figure 1:
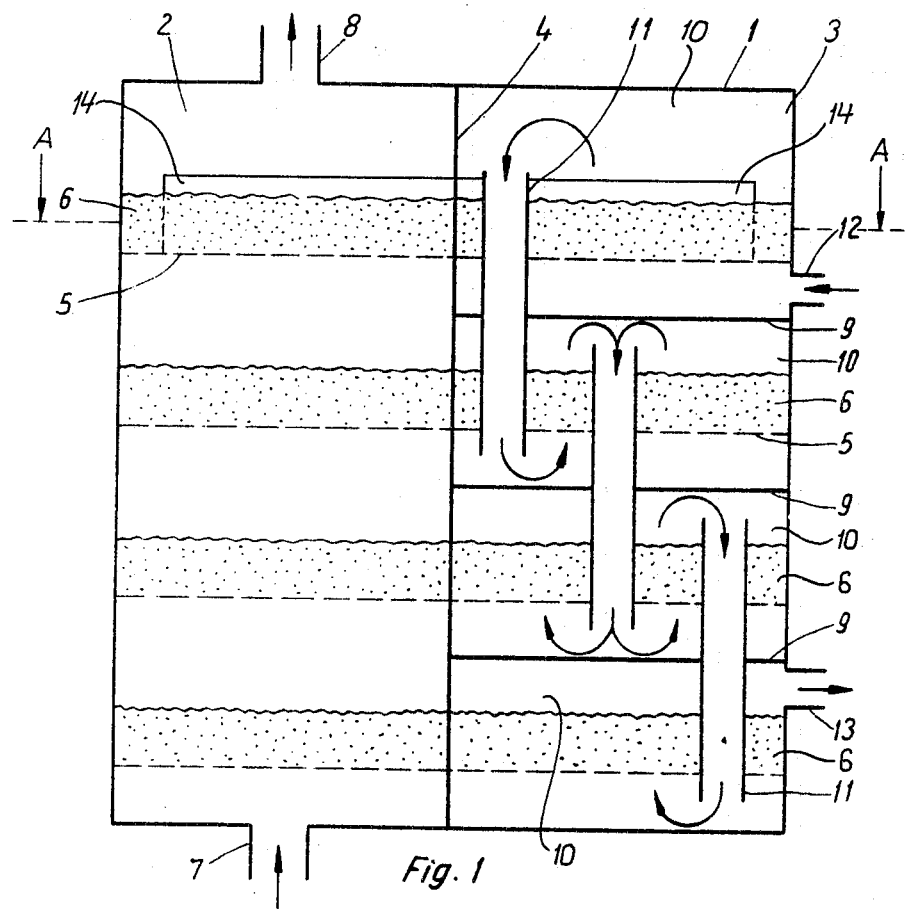
Figure 2:
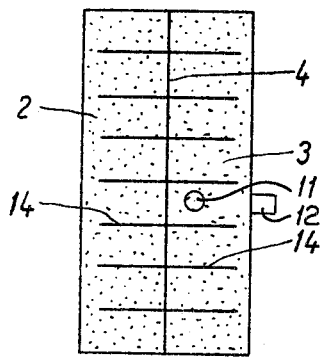
Figure 3:
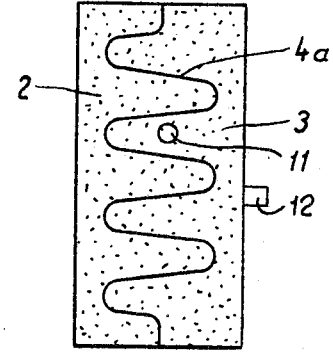

The present invention is further explained with reference to the attached drawing, in which FIG. 1 is a schematic vertical sectional view of a preferred embodiment of an apparatus constructed in accordance with the invention; FIG. 2 is a horizontal sectional view on a reduced scale taken on line A—A in FIG. 1; and FIG. 3 is a view similar to FIG. 2 but showing a modification of the thermally conductive wall of the apparatus.

The apparatus shown in FIG. 1 has a casing 1 containing two chambers 2 and 3 separated by a vertical thermally-conductive wall 4. On both sides of the wall 4 are four horizontal grates 5 spaced vertically from each other. Each grate 5 supports a bed 6 of particles of solid material. Each bed 6 is arranged so that when gas flows through the grate from below, the bed is brought to a suspended or fluidized state while being maintained in heat exchanging contact with the vertical wall 4.

The chamber 2 is provided with an inlet 7 at the bottom and with an outlet 8 at the top for one of the gases which is to be treated in the apparatus. The grates and beds situated in chamber 2 are accordingly arranged so that the gas flows from below and upwards.

The chamber 3 is divided by three horizontal partitions 9 into four superimposed sub-chambers 10 each containing a grate 5 and, lying thereon, a bed 6 of particles of solid material. By means of tubes 11 or the like, each of the spaces over the beds 6 in the three upper sub-chambers 10 communicates with the space under the grate 5 in the next lower sub-chamber 10. The top sub-chamber 10 is provided with an inlet 12 situated below the corresponding grate 5, and the bottom sub-chamber 10 is provided with an outlet 13 situated above the corresponding bed 6. In this way, the grates 5 and beds 6 of chamber 3 are arranged so that the gas flows from the top and downward through chamber 3.

During the flow through chambers 2 and 3, the two gases between which heat is to be transferred through the vertical wall 4 will serve to maintain all the beds 6 in a suspended or fluididized state. Due to these fluidized beds, not only is a very effective heat transfer obtained between each gas and the vertical wall 14 but also the heat exchanging areas are effectively cleaned from insulating layers of different kinds. The gas flow through the apparatus is illustrated in the drawing by arrows, and it will be seen that the heat transfer in the apparatus takes place mainly under a flow of the gases in opposite directions.

The thermally conductive wall 4 is preferably arranged to provide an enlarged area of contact with each fluidized bed. For this purpose, the wall 4 may be provided at opposite sides with vertical flanges or wings 14 protruding into the chambers 2 and 3, as shown in FIG. 2. In FIG. 1, these flanges 14 are show only in association with the uppermost bed 6 in the respective chambers 2 and 3, but it will be understood that additional flanges are similarly associated with the other beds.

In the modification according to FIG. 3, the thermally conductive dividing wall 4a is corrugated to provide the enlarged area of contact. Of course, other configurations may be used for this purpose.

When the apparatus shown in FIG. 1 is used as a ventilation heat exchanger, fresh air may be admitted to the house or other dwelling by way of inlet 12 and outlet 13, while air is expelled from the dwelling by way of inlet 7 and outlet 8 so as to heat the incoming fresh air by heat exchange through the solid particles of the fluidized beds 6 and the dividing wall 4 or 4a. Alternatively, the fresh air may be admitted by way of inlet 7 and outlet 8 while air is expelled by way of inlet 12 and outlet 13. The apparatus may be provided with conventional devices (not shown) for leading away the water which is condensed in the fluidized beds. The particles of solid material used for the beds 6 may be granules of a hydrophobe plastic so as to avoid any tendency to form ice on the particles, with consequent reduction of the heat transferring capacity of the beds. Any moisture which freezes in the bed will then form "snowflakes" which, according to their low specific gravity, will accompany the cooled air discharging from the heat exchanger.

It will be understood that in accordance with the invention, the heat transfer from one gas to the other is effected in at least two steps in each of which the two gases are led through respective fluidized beds 6 of solid particles, these two beds being maintained in heat transferring contact with a thermally conductive wall 4 or 4a separating the two beds from each other; and one of the gases is led through the first step and then through the second step (such as the bottom and next to bottom beds 6, respectively, in chamber 2) while the other gas is led through the second step and then through the first step (such as the next to bottom and bottom beds, respectively, in chamber 3).

I claim:

1. In the transfer of heat from one gas to another gas, the method which comprises carrying out the transfer in at least two steps in each of which the two gases are led through respective fluidized beds of solid particles while maintaining said beds in heat transferring contact with a thermally conductive wall separating the two beds from each other, one of said gases being led through the first step and then through the second step while the other gas is led through said second step and then through said first step.

2. The method of claim 1, in which said beds are maintained in a fluidized state by only those gases which are exchanging heat.

3. The method of claim 1, in which part of the gas which has passed through one bed is returned and led through the bed again.

4. Apparatus for transferring heat from a first gas to a second gas, which comprises means forming two chambers and including a substantially vertically thermally-conductive wall separating the two chambers from each other, at least two fluidized beds of solid particles disposed one above the other in each chamber and in heat transferring contact with said wall, one chamber having an inlet and an outlet arranged for passage of said first gas through the lowermost bed and then through the next upper bed in one chamber, horizontal partition means between the beds in the other chamber and dividing said other chamber into two sub-chambers, the upper of said sub-chambers having an inlet for said second gas located below the bed in said upper sub-chamber, the lower of said sub-chambers having an outlet for said second gas located above the bed in said lower sub-chamber, said upper sub-chamber having a space above the bed therein and said lower sub-chamber having a space below the bed therein, said spaces being in communication with each other whereby said second gas flows first through the upper bed and then through the lower bed in said other chamber.

5. The apparatus of claim 4, in which said vertical thermally-conductive wall has vertical flanges protruding into said chambers.

6. The apparatus of claim 4, in which said vertical thermally-conductive wall is corrugated.

References Cited

UNITED STATES PATENTS 3,075,580   1/1963   Davis _____ 165—104 X

ROBERT A. O'LEARY, Primary Examiner

A. W. DAVIS, Jr., Assistant Examiner

U.S. Cl. X.R.

34—57; 62—57; 165—104

PO-1050
(5/69)

UNITED STATES PATENT OFFICE
CERTIFICATE OF CORRECTION

Patent No. 3,512,577　　　　　　　　Dated May 19, 1970

Inventor(s) Bronislav Stefan Javorsky

It is certified that error appears in the above-identified patent and that said Letters Patent are hereby corrected as shown below:

Col. 1, line 34, after "exchanging", insert --surfaces would very soon be impaired by the heat exchanging--.

Col. 2, line 43, change "fluididized" to --fluidized--.

Col. 2, line 57, change "show" to --shown--.

Col. 4, line 10, after "bed in", insert --said--.

Signed and sealed this 23rd day of March 1971.

(SEAL)
Attest:

EDWARD M. FLETCHER, JR.　　　　　　　　WILLIAM E. SCHUYLER, JR.
Attesting Officer　　　　　　　　　　　Commissioner of Patents